Figure 1:
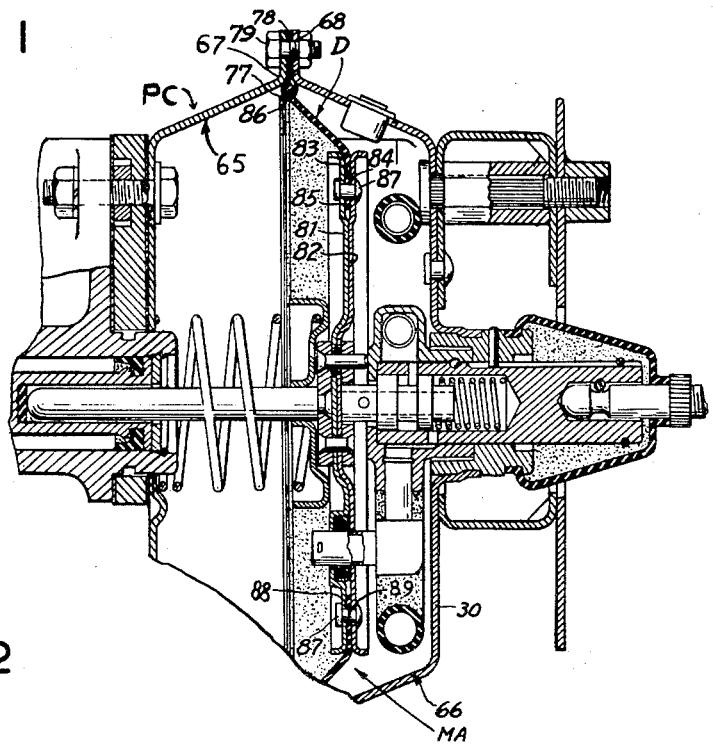

Feb. 9, 1965 G. T. RANDOL 3,168,855
DETACHABLE MOUNTING MEANS FOR FLEXIBLE POWER-DIAPHRAGMS
Original Filed Sept. 19, 1957

*Inventor*

United States Patent Office 3,168,855
Patented Feb. 9, 1965

3,168,855
DETACHABLE MOUNTING MEANS FOR
FLEXIBLE POWER-DIAPHRAGMS
Glenn T. Randol, 3 E. 2nd Ave., Loch Lynn,
P.O. Box 275, Mountain Lake Park, Md.
Original application Sept. 19, 1957, Ser. No. 684,946, now
Patent No. 3,101,032, dated Aug. 20, 1963. Divided
and this application Aug. 19, 1963, Ser. No. 303,086
3 Claims. (Cl. 92—99)

This application is a division of my copending application Serial No. 684,946 filed September 19, 1957, now issued to Patent No. 3,101,032 dated August 20, 1963.

In my copending application referred to, I have disclosed a pressure differential operated servomotor having a two-section walled enclosure (power cylinder) with a piston-like power member movable therein under influence of said pressure differential, said power member having an outer ring-like flexible portion connected at its periphery to the interior of the power cylinder at the juncture of the said two sections. There are certain features of construction and operation which relate particularly to the peripheral connection of the flexible portion of the power member, thus rendering such features applicable to servomotors and the like other than the disclosed novel servomotor, and which may be utilized in operative association with activatable systems and/or devices other than those which characterize a vehicular brake system. These features of the power cylinder form the subject-matter of the present application.

The present invention has for a primary objective, the provision of new and improved means for attaching the peripheral margin of the flexible portion of such a power-diaphragm assembly to a power cylinder within which said assembly reciprocates.

More specifically, the means for connecting the periphery of a flexible power-diaphragm comprise: an outturned flange defining the open end of each of a pair of cup-like shells which in assembled status produce the power cylinder, a pair of metallic rings contiguous to each other and to the confronting faces on said flanges, the inner marginal portions of the rings being formed with substantially semi-circular grooves terminating at the inner edges thereof in an angular outturned flange to form an annular opening from the interior of the power cylinder into an annular channel formed between the confronting semicircular grooves in spaced relation, said annular channel being adapted to receive an annular bead defining the periphery of the flexible portion of the power-diaphragm and subject said bead to slight deformation to effect an airtight seal between the periphery of the diaphragm and the interior of the power cylinder shells substantially in juxtaposition with respect to the point of divergence of the inner ends of the shell flanges. A plurality of aligned holes is provided through the shell flanges and metallic rings through which suitable fasteners, such as the disclosed bolts with threaded nuts thereon, are inserted and drawn tightly to effect a metal-to-metal airtight connection between the rings and open flanged ends of the power cylinder shells with the added advantage accruing from this novel arrangement of insuring that the openings through the end walls of the shells are assembled in coaxial disposition so as not to bind the working parts operably projecting through these spaced openings, and too, a fewer number of clamping bolts is required as against the larger number used where the peripheral margin of the flexible diaphragm is anchored directly between the shell flanges as commercially practiced.

Accordingly, the aforesaid novel and improved means for anchoring the periphery of the flexible power-diaphragm to the interior of the power cylinder provide the advantages of a metal-to-metal flange contact of the two shells for a more rigid assembly and precision coaxial relationship therebetween as well as facilitating assembly and disassembly of the diaphragm with respect to the power cylinder.

Figure 2:
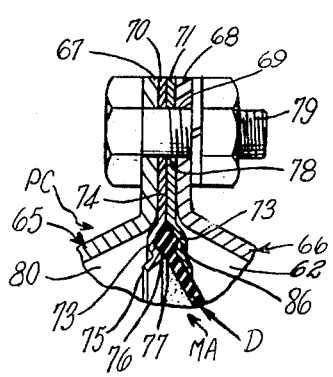

Other important objects and advantages of the present invention will be apparent to one skilled in the art to which the invention relates from the following detailed description considered in conjunction with the accompanying drawings, in which:

FIGURE 1 is a longitudinal vertical section of a pressure differential servomotor incorporating the present invention; and FIGURE 2 is a fragmentary portion of FIGURE 1 on an enlarged scale showing details of the novel means for anchoring the peripheral portion of the flexible portion of the power-diaphragm to the interior of the power cylinder.

Referring now to the drawing, and particularly to the two figures thereon, wherein I have disclosed the servomotor diaphragm anchoring means constituting the present invention in association with a fluid-pressure-operated servomotor disclosed herein as a vacuum-power cylinder designated as a whole by the reference character "PC."

Referring now to FIGURE 2 wherein there is disclosed the fragmentary section of my novel and improved means for anchoring the outer peripheral portion of a ring-like flexible wall or diaphragm generally designated "D" comprising a part of the power assembly designated as a whole "MA" the latter being movably incorporated within the power cylinder PC with the periphery of the ring-like flexible portion substantially in circular alignment with the juncture of the outturned annular flanges 67, 68 defining the open confronting ends of the two complemental shells 65, 66 respectively adapted to form the aforesaid power cylinder PC as shown in FIGURE 1. The flanges 67, 68 are provided with a plurality of circumferentially spaced registering holes 69. A pair of metallic rings are each formed in a cross section with an inner substantially semi-circular portion 73 merging with an offset flat outer marginal portion 74 with the confronting sides of the latter portions contiguous and the confronting inner angularly flanged ends 75 of the portions 73 divergently spaced to provide a circular opening 76 leading into an annular substantially circular in cross section channel 77 between the confronting semicircular portions. The flat portions of the rings are provided with holes 78 registering with the holes 69 in the shell flanges aforesaid for reception of cap bolts 79, for example, with nuts thereon threaded into clamping relation with the two shells 65, 66 and metallic rings in a rigid metal-to-metal unitary assembly with the channel 77 lying adjacent to and between the inner marginal portions of the outturned flanges 67, 68 for an important purpose to appear.

The aforesaid power assembly MA comprises a metallic central portion consisting of a pair of juxtapositioned plates 81, 82 mounted back-to-back with their peripheral marginal wall portions offset outwardly at 83 to form an external annular channel 84 therebetween for reception of the inner marginal portion 85 of the flexible diaphragm D, the outer periphery of said diaphragm being defined by a circular ridge or bead 86 in cross section which engages the annular channel 77 to anchor the diaphragm to the inner side of the power cylinder PC at the diverging juncture of the shell flanges 67, 68 in airtight sealed relation thereto, it being particularly noted that when the two metallic rings are assembled between the shell flanges 67, 68 and the clamping bolts 79 drawn tightly, that the semicircular portions on the metallic rings impose compression on the diaphragm bead to insure its being airtight and securely anchored to prevent loss of vacuum between the flanges 67, 68 and the metallic rings, and to isolate the fluid pressure chambers 62, 80 on opposite sides of the power-diaphragm MA from each other to enable pressure differential to move said power-diaphragm during activated status of the servomotor. A plurality of fasteners such as rivets 87 projecting through aligned holes 88, 89 in the plates 81, 82 respectively to effect unitary airtight assembly of these plates and the inner marginal portion 85 of the diaphragm D. Accordingly, I have provided a simple and effective means for attaching the outer periphery of the flexible portion of a power-diaphragm to the inner side of the power cylinder in airtight sealed relation thereto, plus the advantages of metal-to-metal unitary assembly of the two shells comprising the power cylinder PC, thereby preventing angular distortions in the power unit PC when actuating forces are effective thereagainst, both internally from the pressure differential and externally from operator force exerted on the working parts during "straight-through" operation of the master brake cylinder in cooperation with the servomotor or independently thereof should power failure occur. A further advantage is provided in the assembly and disassembly of the power cylinder PC which are greatly facilitated due to the periphery of the flexible diaphragm not requiring a definite location with respect to the mating metallic clamping rings and the shell flanges 67, 68 with the assurance the assembly is airtight and lowering the cost of producing the diaphragm as well since the peripheral bead can be molded on rubberized fabric rather than the more costly method of a completely molded diaphragm. In the event replacement of the flexible portion of the power assembly MA is necessary, this operation can be efficiently carried out by any service station attendant or garage mechanic without special tool or training.

Although my invention has been shown and described in connection with certain specific embodiments, the underlying concept is obviously applicable in other installations that will readily occur to persons skilled in the art to which the invention relates. The invention, therefore, is to be limited only as indicated by the terms of the subjoined claims.

Having thus described my invention, I claim:

1. In a two-section walled enclosure supported as a unit on a fixed member, and having a flexible wall centrally attached to a plate movable therein, and means for attaching said wall to the plate, the improvement which comprises: a pair of cup-shaped shells having their open confronting ends flanged outwardly; a plurality of circumferentially spaced complemental holes through said shell flanges; a pair of juxtaposed metallic rings positioned between said shell flanges and processed with a corresponding number of holes complemental to those in the shell flanges; a corresponding number of fasteners projecting through the holes in the shell flanges and metallic rings to secure the shells and rings in a rigid metal-to-metal unitary assembly to produce said walled enclosure; an annular channel of substantially semicircular cross-section defining the inner marginal portion of each ring in confronting spaced relationship to one another to produce another annular channel of substantially circular cross-section, with the inner edge portions of said first-named channels terminating in laterally diverging annular flanges to provide a circular opening communicating with the other annular channel aforesaid; and an annular bead of larger cross-section than said other channel, defining the outer marginal peripheral portion of said flexible wall, and adapted to engage said other channel whereby the peripheral portion of said flexible wall is anchored adjacent the inner peripheries of said shell flanges under compression to effect an airtight seal therebetween upon unitary assembly of said shells and rings.

2. In a two-section walled enclosure in which each section is formed cup-shaped and provided with a complemental outstanding annular flange defining its open end and processed with a plurality of circumferentially spaced holes through said flange, and an integral wall defining the closed end thereof in parallelly spaced relationship to the flanged end further provided with manually detachable means for attaching the end wall of one section to a spaced fixed member having a plurality of holes therein radially offset from the axis of said enclosure, a flexible wall centrally attached to a plate movable within said enclosure, and means for attaching said flexible wall to the plate, the improvement which comprises: a pair of juxtaposed metallic rings disposed between and complemental to said enclosure flanges, and provided with a pattern of holes in alignment with the holes through the enclosure flanges; a like-number of fasteners projecting through said aligned holes in the enclosure flanges and said pair of rings to secure the two sections of the enclosure and said rings in a rigid metal-to-metal unitary assembly to produce said walled enclosure; an annular channel of substantially semicircular cross-section defining the inner marginal portion of each ring in confronting spaced relationship to one another to produce another annular channel of substantially circular cross-section, with the inner edge portions of said first-named channels terminating in laterally disposed diverging flanges respectively to produce a circular opening communicating with the other annular channel aforesaid; an annular bead of larger cross-section than said other annular channel, defining the outer marginal peripheral portion of said flexible wall, and adapted to engage said other annular channel whereby the peripheral portion of said flexible wall is anchored adjacent the inner peripheries of said enclosure flanges under compression to effect an airtight seal therebetween upon unitary assembly of said enclosure sections and rings.

3. In a two-section walled enclosure supported as a unit on a fixed member, and having a flexible wall centrally attached to a solid member movable therein, and means for attaching said wall to said solid member, the improvement which comprises: a pair of cup-shaped shells having their confronting open ends outwardly flanged; a pair of juxtaposed metallic rings positioned between said shell flanges; means for fastening said shell flanges and metallic rings together in a rigid metal-to-metal unitary assembly to produce said walled enclosure; an annular channel defining the inner marginal portion of each ring in confronting spaced relationship to one another to produce an annular space therebetween, with the inner edge portions of said annular channels terminating in laterally diverging annular flanges to provide a circular opening communicating with the annular space aforesaid; and an annular embossment of larger cross-section than said annular space, defining the outer marginal peripheral portion of said flexible wall, and adapted to engage said annular space whereby the peripheral portion of said flexible wall is anchored adjacent the inner peripheries of said shell flanges under compression to effect an airtight seal therebetween upon unitary assembly of said shells and rings.

No references cited.

RICHARD B. WILKINSON, *Primary Examiner.*